United States Patent
Casati et al.

(10) Patent No.: US 7,428,486 B1
(45) Date of Patent: Sep. 23, 2008

(54) SYSTEM AND METHOD FOR GENERATING PROCESS SIMULATION PARAMETERS

(75) Inventors: Fabio Casati, Palo Alto, CA (US);
Ming-Chien Shan, Saratoga, CA (US);
Maria Guadalupe Castellanos, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 11/047,163

(22) Filed: Jan. 31, 2005

(51) Int. Cl.
*G06F 9/45* (2006.01)
*G06F 9/44* (2006.01)

(52) U.S. Cl. .......................... 703/22; 717/100
(58) Field of Classification Search .............. 382/115; 707/101, 1, 100; 703/14, 16, 22
See application file for complete search history.

(56) References Cited

U.S. PATENT DOCUMENTS

| | | | |
|---|---|---|---|
| 5,598,344 A * | 1/1997 | Dangelo et al. ............ 716/18 |
| 6,222,619 B1 * | 4/2001 | Herron et al. ............. 356/39 |
| 6,295,635 B1 * | 9/2001 | Dhaene et al. ............ 716/14 |
| 6,580,814 B1 * | 6/2003 | Ittycheriah et al. ........ 382/115 |
| 6,633,882 B1 * | 10/2003 | Fayyad et al. ............ 707/101 |
| 7,010,483 B2 * | 3/2006 | Rajan ..................... 704/228 |
| 7,076,474 B2 * | 7/2006 | Jin et al. ................. 706/45 |
| 7,124,071 B2 * | 10/2006 | Rich et al. ............... 703/16 |
| 2003/0233273 A1 * | 12/2003 | Jin et al. ................. 705/11 |
| 2003/0236691 A1 * | 12/2003 | Casatl et al. ............. 705/8 |
| 2004/0030667 A1 * | 2/2004 | Xu et al. ................. 707/1 |
| 2004/0098159 A1 * | 5/2004 | Brown ................... 700/117 |

* cited by examiner

*Primary Examiner*—Kamini Shah
*Assistant Examiner*—David Silver

(57) ABSTRACT

A system and method is disclosed for generating process simulation parameters. The method discloses: identifying an execution process; partitioning the process in accordance with a partitioning rule; and generating simulation parameters for each partition. The system discloses various means for effecting the method.

24 Claims, 7 Drawing Sheets

_US 7,428,486 B1_

SYSTEM AND METHOD FOR GENERATING PROCESS SIMULATION PARAMETERS

BACKGROUND

Process simulation can be used to model one or more process critical to the operation and success of an organization. Generally, processing simulation can take on various forms from physical modeling of existing or proposed processes to virtual modeling and simulation using various software tools and computing applications. The commonality among existing approaches is the ability to identify the strength and weaknesses of a given process before expending the time and resources in implementing the given process. The foresight that results from process simulation can be used to derive various benefits including but not limited to competitive business advantages, optimization of process resources (e.g., labor, time, money, raw materials, facilities, etc.), and optimization of process workflow. Process simulation spans various industries and is utilized in numerous contexts. Ranging from manufacturing process simulation to business operations and management process simulation, process simulation can offer insightful data used in decision making.

Currently, there are various computing and non-computing process simulation tools and utilities available to assist in performing process simulation. For example, iGrafx and SImProcess are computing process simulation tools that allow participating users the ability to virtually run desired processes to identify the processes strengths and weaknesses. Current implementations, however, can be cumbersome and resource intensive requiring participating users to model many aspects of the process being simulated. Moreover, given the user-defined modeling architecture of current process simulation processes there is apt to be more frequent errors in the definition of the simulation model. Such errors can result in non-realistic process simulation (i.e., the simulated process does not represent the actual process) and, correspondingly, errant process analysis data.

BRIEF DESCRIPTION OF THE DRAWINGS

The cluster based process simulation systems and methods are further described with reference to the accompanying drawings in which.

DETAILED DESCRIPTION

Overview

The herein described systems and methods aim to ameliorate the shortcomings of existing practices by providing the automated creation of a set (or sets) of simulation models, that when executed, offer a more accurate, efficient simulation of a process under development. In an illustrative implementation, a process simulation model environment comprises a process simulation model engine to automatically create process simulation models. In the illustrative implementation, a process simulation model can comprise a process model (e.g., the different steps that compose a process, the order in which the steps are to be executed, and data consumed by each of the steps). Additionally, the process simulation model can comprise statistical information about durations encountered in a process model node (e.g., probability distribution of the duration of a step), the number of resources required to execute a certain step, data produced by the various process model steps, the arrival rate of the processes (e.g., how often new process instances are created), the cost for executing steps, or the cost of using a selected resource as part of a process.

In an illustrative operation, the exemplary process simulation model engine receives as input at least one process model and one or more process execution logs (e.g., data representative of past executions of this process) to generate one more process simulation parameters. In an illustrative operation, the process simulation model engine can generate probability distributions for node durations and other parameters, in addition to process instance arrival rates. Using the generated simulation parameters, the process simulation model engine can operate to simulate the process to determine how the process might behave with the generated parameters. In doing so, the process simulation model engine relieves process designers from specifying simulation models which current practices require.

It is appreciated that the illustrative implementation and operation are merely descriptive and that the herein described systems and methods can be applied to various process models and process execution logs (e.g., process logs can be produced by a simulation tool such as HP Business Project Insight) and are agnostic to such components.

Illustrative Computing Environment

Figure 1:
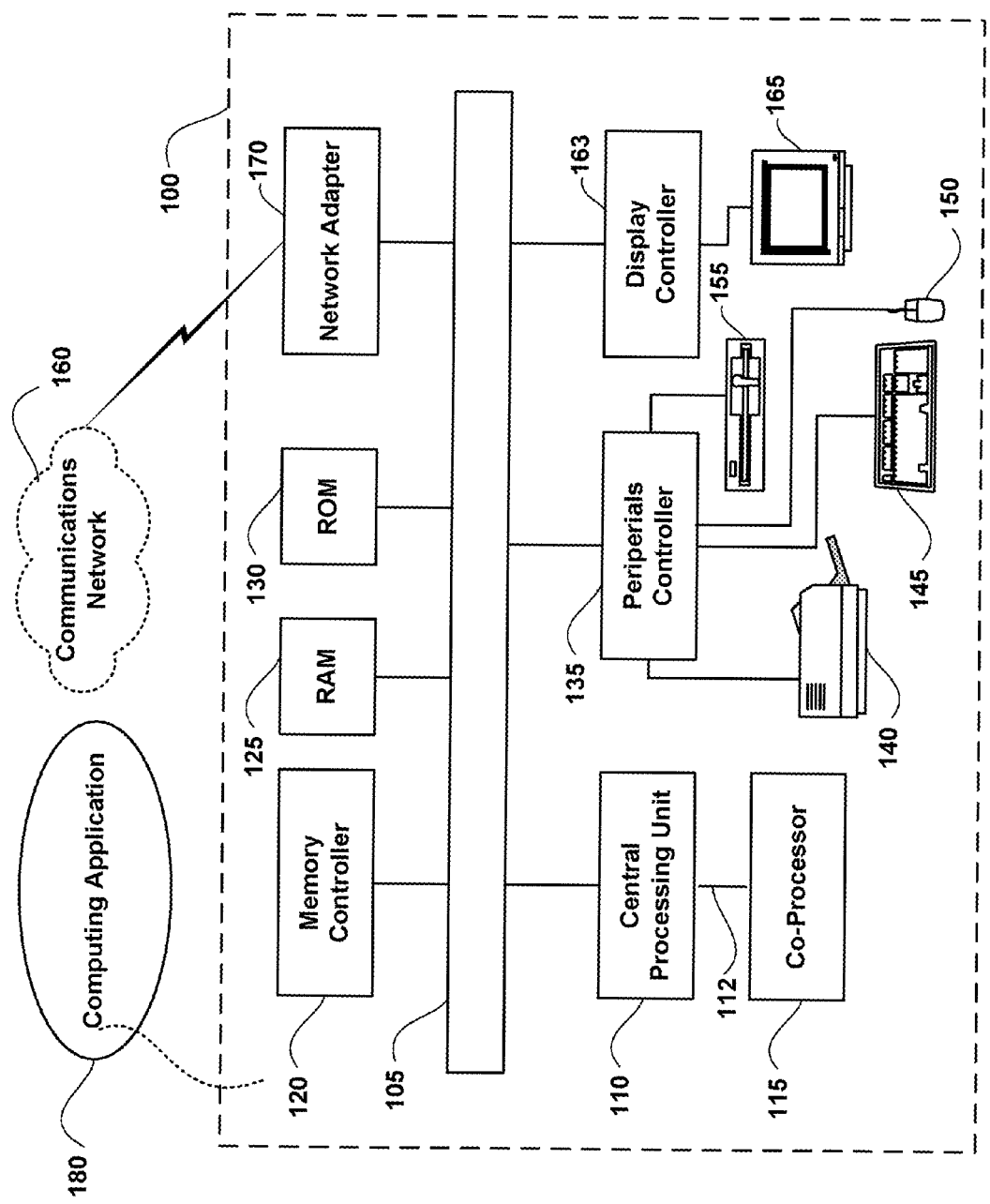
FIG. 1 is a block diagram of an exemplary computing environment in accordance with an implementation of the herein described systems and methods.

FIG. 1 depicts an exemplary computing system 100 in accordance with herein described system and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

It is appreciated that although an illustrative computing environment is shown to comprise the single CPU 110 that such description is merely illustrative as computing environment 100 may comprise a number of CPUs 110. Additionally computing environment 100 may exploit the resources of remote CPUs (not shown) through communications network 160 or some other data communications means (not shown).

In operation, the CPU 110 fetches, decodes, and executes instructions, and transfers information to and from other resources via the computer's main data-transfer path, system bus 105. Such a system bus connects the components in the computing system 100 and defines the medium for data exchange. The system bus 105 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, the computing system 100 may contain peripherals controller 135 responsible for communicating instructions from the CPU 110 to peripherals, such as, printer 140, keyboard 145, mouse 150, and data storage drive 155.

Display 165, which is controlled by a display controller 163, is used to display visual output generated by the computing system 100. Such visual output may include text, graphics, animated graphics, and video. The display 165 may be implemented with a CRT-based video display, an LCD-based flat-panel display, gas plasma-based flat-panel display, a touch-panel, or other display forms. The display controller 163 includes electronic components required to generate a video signal that is sent to display 165.

Further, the computing system 100 may contain network adaptor 170 which may be used to connect the computing system 100 to an external communication network 160. The communications network 160 may provide computer users with connections for communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Figure 2:
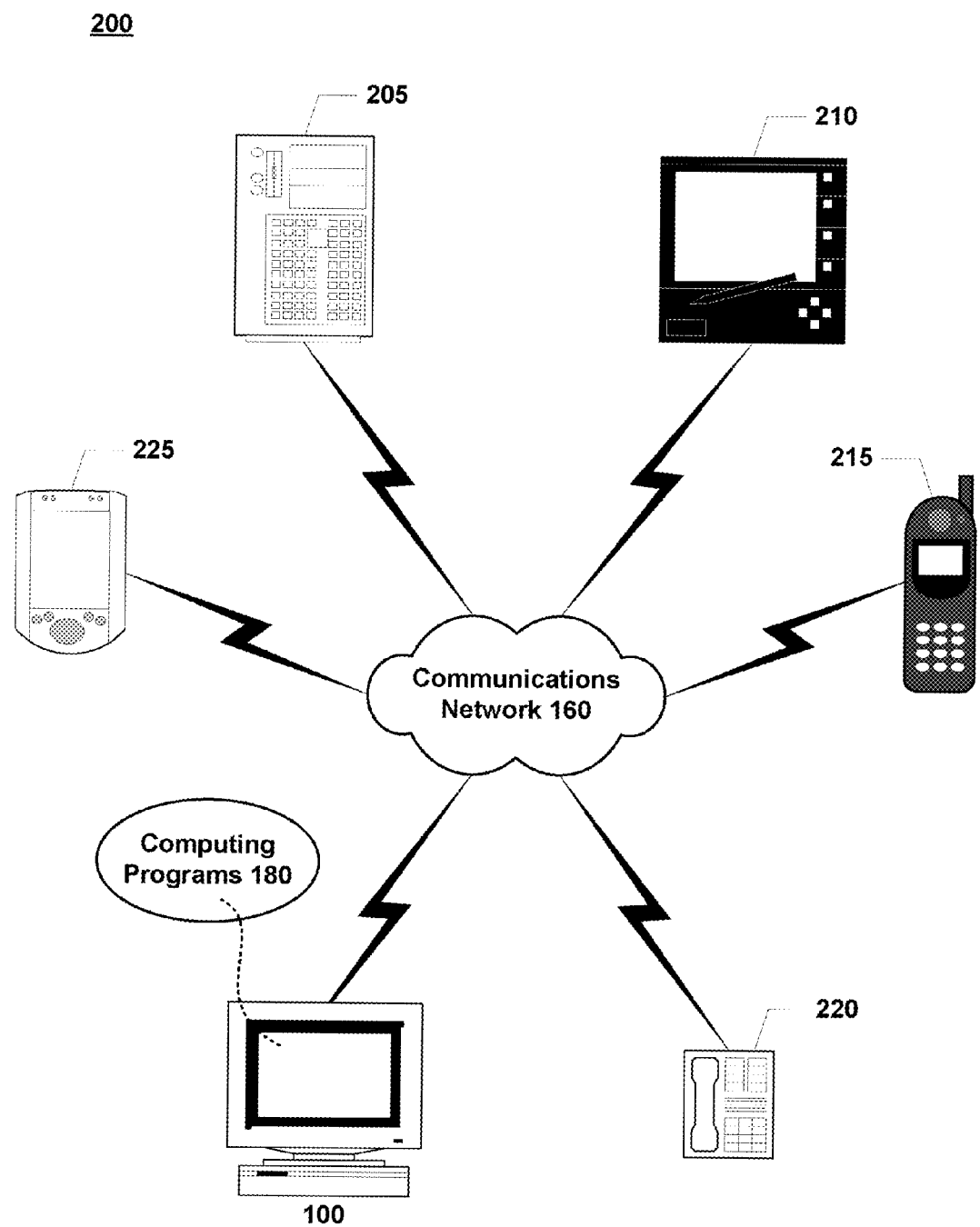
FIG. 2 is a block diagram showing the cooperation of exemplary components of an exemplary data communications architecture.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 205 may be interconnected via a communications network 160 (which may be either of, or a combination of a fixed-wire or wireless LAN, WAN, intranet, extranet, peer-to-peer network, the Internet, or other communications network) with a number of client computing environments such as tablet personal computer 210, mobile telephone 215, telephone 220, personal computer 100, and personal digital assistance 225. In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Each client computing environment 100, 210, 215, 220, and 225 can be equipped with browser operating system 180 operable to support one or more computing applications such as a web browser (not shown), or a mobile desktop environment (not shown) to gain access to server computing environment 205.

In operation, a user (not shown) may interact with a computing application running on a client computing environments to obtain desired data and/or computing applications. The data and/or computing applications may be stored on server computing environment 205 and communicated to cooperating users through client computing environments 100, 210, 215, 220, and 225, over exemplary communications network 160. A participating user may request access to specific data and applications housed in whole or in part on server computing environment 205. These data may be communicated between client computing environments 100, 210, 215, 220, and 220 and server computing environments for processing and storage. Server computing environment 205 may host computing applications, processes and applets for the generation, authentication, encryption, and communication of web services and may cooperate with other server computing environments (not shown), third party service providers (not shown), network attached storage (NAS) and storage area networks (SAN) to realize such web services transactions.

Figure 3:
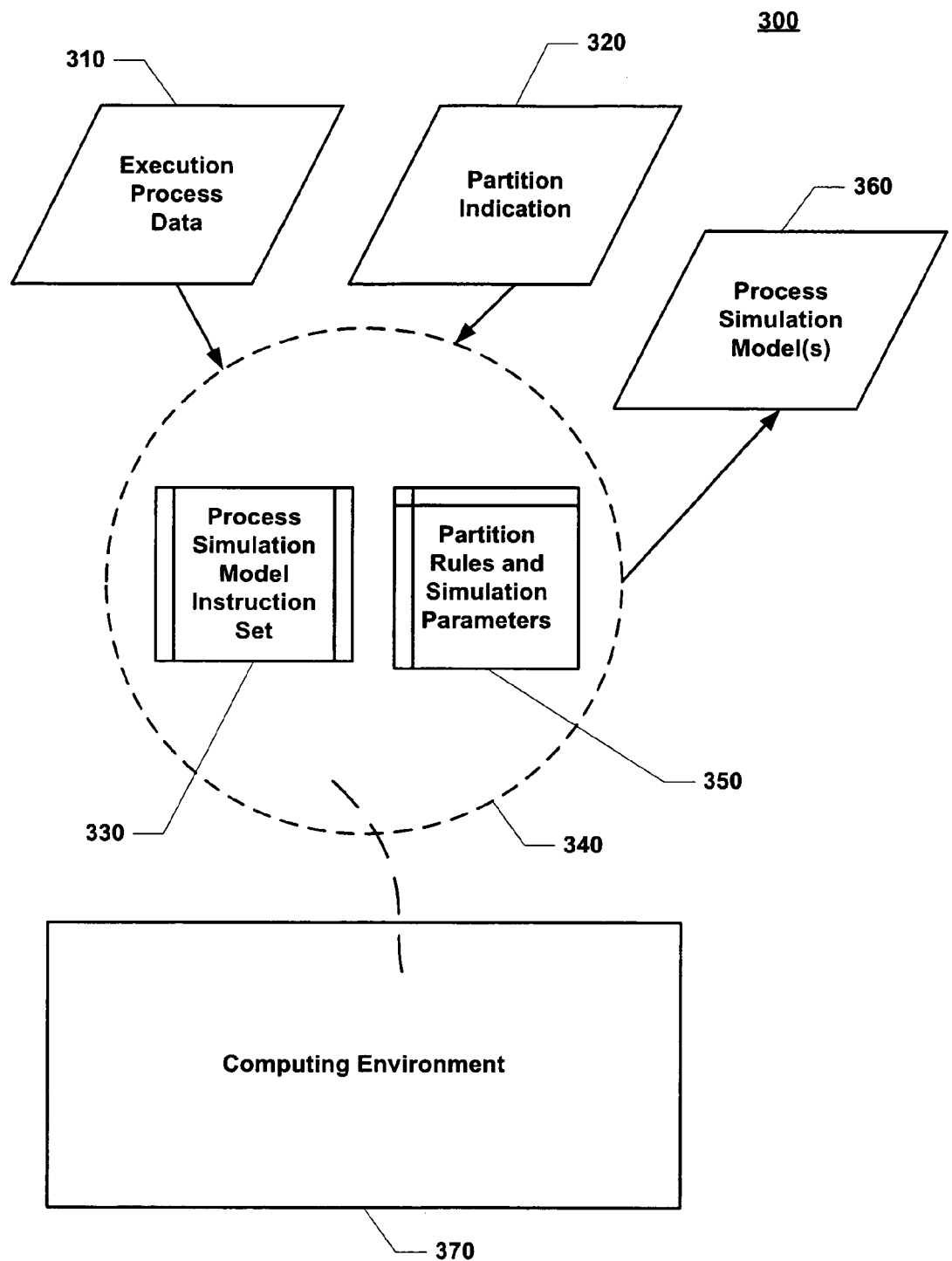
FIG. 3 is a block diagram showing an exemplary implementation of a process simulation model environment in accordance with the herein described systems and methods.

Process Simulation:

FIG. 3 shows the cooperation of exemplary components of exemplary process simulation model environment 300. In an illustrative implementation, and as is shown in FIG. 3, exemplary process simulation model environment 300 comprises execution process data 310, partition indication 320, processing simulation model(s) 360, process simulation model computing application 340, and computing environment 370. Additionally, process simulation computing application 340 comprises process simulation model instruction set 330 and partition rules 350.

In an illustrative operation, exemplary process simulation model computing application 340 can operate on computing environment 350 to generate process simulation parameters for use when simulating processes and when generating process simulation models. In the illustrative operation, exemplary process simulation model computing application 340 can accept as input process execution data 310 and/or partition indication data 320. Process execution data 310 and/or partition indication data 320 can be processed by exemplary process simulation model computing application 340 according to one or more instructions that can be found in process simulation model instruction set 330 to generate process simulation model(s) 360. Additionally, as is shown, process execution data 310 and/or partition indication data 320 can be processed by process simulation model computing application 340 according to one or more instructions that can be found in process simulation model instruction set 330 such that process simulation model computing application 340 can identify partition rules and simulation parameters 350. Partition rules and simulation parameters 350 can be used in subsequent processing by process simulation model computing application 340 when executing other process execution data 310 and/or other partition indications 320. The reuse of partition rules and simulation parameters 350 can allow for more efficient generation of process simulation model(s) 360.

Figure 4:
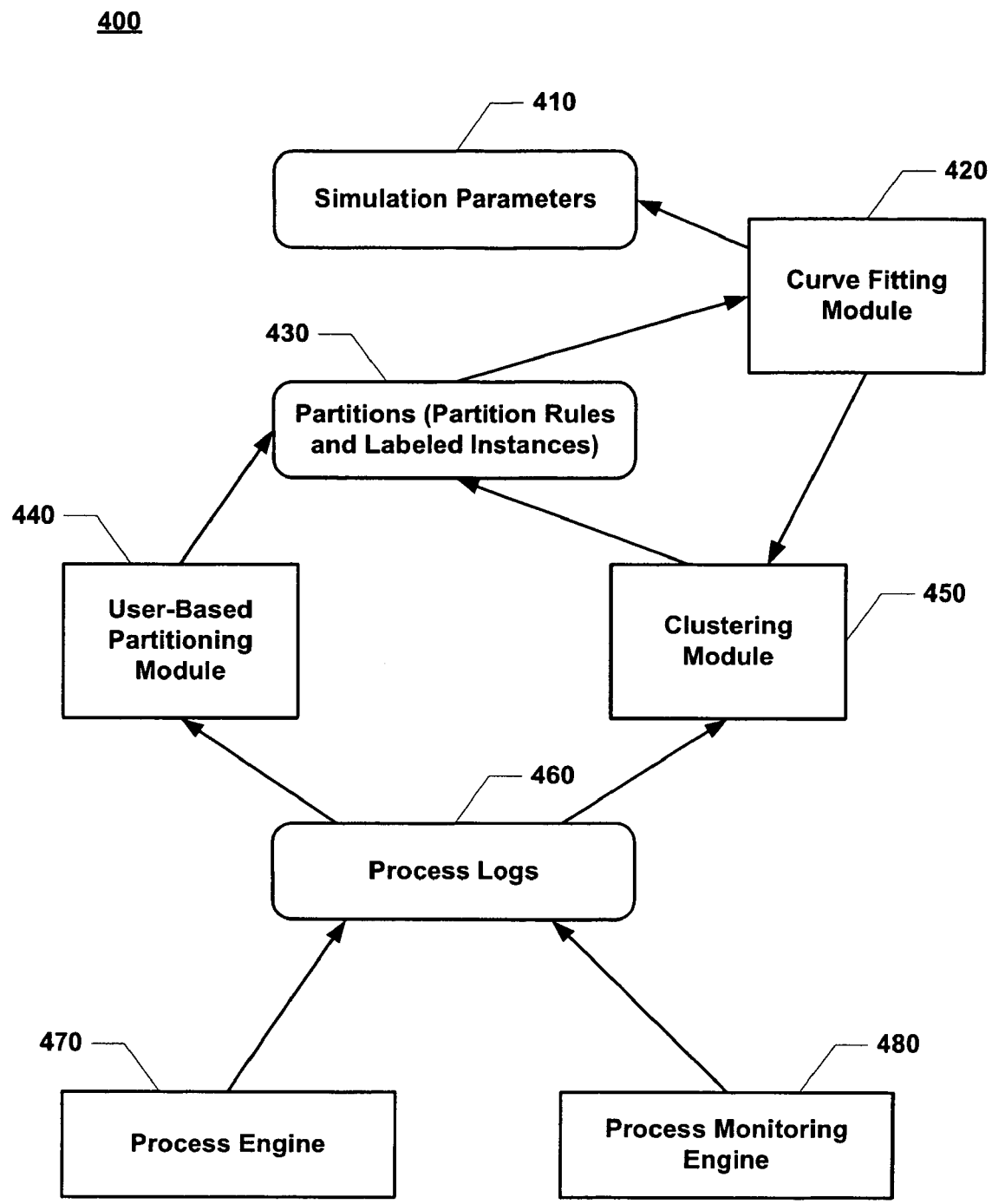
FIG. 4 is block diagram showing an exemplary implementation of the components of an exemplary process simulation model environment in cooperation in accordance with the herein described systems and methods.

FIG. 4 shows the cooperation of exemplary components of exemplary process simulation model environment 400. In an illustrative implementation, and as is shown in FIG. 4, exemplary process simulation model environment 400 comprises simulation parameters 410, curve fitting module 420, partitions (e.g., partition rules and labeled instances) 430, user based partitioning module 440, clustering module 450, process logs 460, process execution log engine 470, and process monitoring engine 480.

In an illustrative operation, process execution log engine 470 and/or processing monitoring engine 480 can generate process logs 460 using one or more process executions (not shown). As is shown, process logs 460 can act as input for user based partition module 440 and/or clustering module 450. In an illustrative implementation, partitioning module 440 can obtain user preferences for the partitioning (e.g., through a user interface) and can apply obtained partitioning rules to label process execution data. Also, clustering module 450 can operate to generate partitioning rules based on selected rules (e.g., statistical rules) applied to process logs 460. The output of user-based partitioning module 440 and/or clustering module 450 can be partitions (e.g., stored partition rules and labeled instances) 430. Curve fitting module 420 can use partitions 430 and data from clustering module 450 to generate simulation parameters 410. The simulation parameters can then be used by the exemplary simulation model environment 400 to generate process simulation models (not shown) that can be used by participating users (not shown) to ascertain the behavior of one or more processes.

Figure 5:
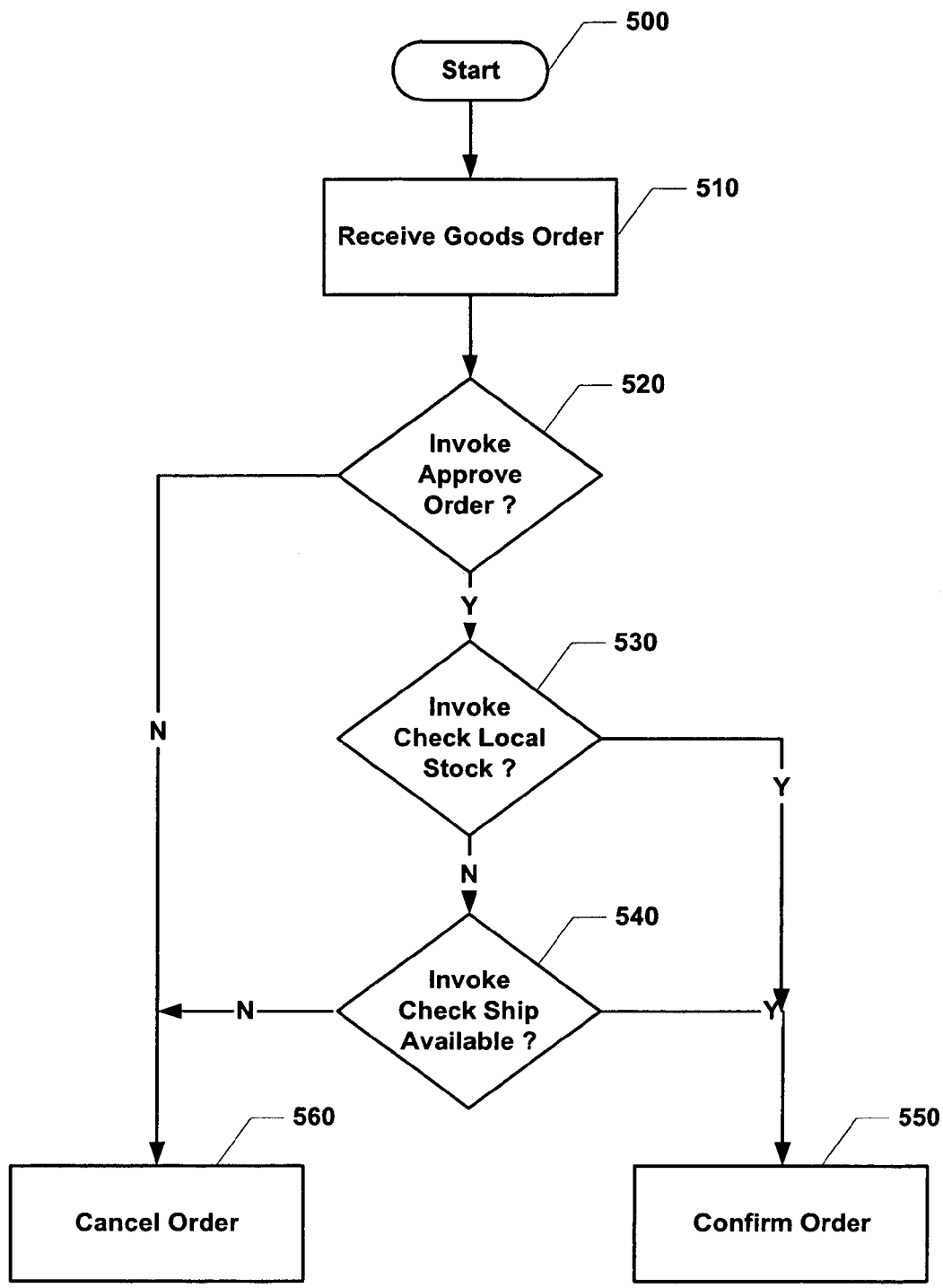
FIG. 5 is a flow diagram of an exemplary process model in accordance with an illustrative implementation of the herein described systems and methods.

FIG. 5 shows an exemplary process execution that can act as input to an exemplary process simulation model engine.

For the purposes of the illustrative implementation, the exemplary process is a customer service process that can be performed by a customer service department of an enterprise. It is appreciated that although the exemplary process is described in the context of a customer service process that such description is merely illustrative as the inventive concepts described herein apply to numerous processes.

As is shown, processing begins at block 500 and proceeds to block 510 where an order for goods is received. A check is then performed at block 520 to determine whether to invoke an approve order action. If the check at block 520 indicates to not approve the order, processing proceeds to block 560 where the order is cancelled and the processing terminates. However, if at block 520 it is determined that order is to be approved processing proceeds to block 530 where a check is performed to determine if the goods ordered are located in the local stock. If the check at block 530 indicates that the ordered goods are in the local stock, processing proceeds to block 550 where the order is confirmed and then process terminates. However, if the check at block 530 indicates that the ordered goods are not in the local stock, processing proceeds to block 540 where a check is performed to determine if the goods are available from an alternate source. If the check at block 540 indicates that the goods are located at an alternate source and can be shipped, processing proceeds to block 550 and continues from there. However, if the check at block 540 indicates that the goods are not located at an alternate source and/or are not ready to ship from the alternate source, processing proceeds to block 560 and continues from there.

In an illustrative implementation, exemplary process simulation model environment 400 of FIG. 4 can operate to provide the automated generation of collections of simulation models that, when processed in the aggregate can provide efficient and accurate process simulation. In an illustrative implementation, a participating user (not shown) can provide a process and a set of process execution logs (e.g., data regarding past executions for the provided process). Receiving the process and process execution logs as input, exemplary processing simulation model environment 400 can operate to generate process simulation parameters from the past execution data. In an illustrative implementation, process simulation model environment can generate probability distributions for node durations (e.g., how long a particular step of a process takes), node parameters (e.g., parameters associated to each process step), and arrival rates (e.g., how often a particular step in a multi-path process is being performed). In the illustrative implementation, the probability distributions can be generated by applying a curve fitting tool to the process data (e.g., process parameters and process execution logs). In the illustrative implementation, prior to simulating the process, the exemplary process simulation model environment can partition the process execution. That is, the process execution can be divided into disjoined process execution groups (e.g., clusters) and the exemplary process simulation model environment can generate separate simulation models for each group. When partitioning the process execution, exemplary process simulation model environment can operate to identify one or more partition rules (e.g., criteria that can define if a process instance belongs to a certain partition).

In an illustrative operation, exemplary process shown in FIG. 5 can be used to generate a process simulation model. In this illustrative operation context, and referring to FIG. 5, the order amount can be partitioned such that the partitioning rule can be Order_Amount<$1000 (e.g., partition 1) and Order_Amount>=$1000 (e.g., partition 2). Using these defined partitions and the identified partition rules, the exemplary process simulation model environment can generate a set of simulation models, each applicable to simulate processes that have certain characteristics (i.e., whose instances belong to one partition, as defined by the partition rules).

In the illustrative operation, the method of partitioning can be varied and can comprise various steps. In an illustrative operation, the partitioning criteria (e.g., steps for partitioning) can comprise a user definition for partitioning. In another illustrative operation, the partitions and the rules that define whether an instance belongs to a certain partition can be automatically determined by the process simulation model environment according to selected statistical rules and constructs that can applied to the process execution logs (e.g., partition according to a selected price point—$100—i.e., if the process execution log indicates that there is a significant difference in the simulation model for instances that are below a price of $100 with respect to instances that handle orders for more than $100). In the context of user defined partitioning criteria, in an illustrative operation, a participating user (not shown) of the exemplary process simulation model environment can define criteria for partitioning (e.g., user can define a set of rules that divide the instances in partitions based on process instance execution data). In the illustrative implementation provided previously, a participating user can define partitions that are identified by the rule Process.Order_Amount<$1000 (partition 1) and Process.Order_Amount>=$1000 (partition 2).

Additionally, the process simulation model environment can employ hybrid methods for partition criteria definition (e.g., some user defined and some automatically defined). In this context, participating users can select partitioning criteria and the exemplary process simulation model environment can verify whether these criteria actually correspond to instances having statistically different models.

The exemplary process simulation model environment can process various simulation parameters when generating a process simulation model. In this context, in an illustrative implementation, the process simulation model environment can process simulation parameters comprising probability distribution of the node duration and branch probabilities (probability that the flow will follow a certain path). In this context, it can be expected that a partition will have different values for at least one of these parameters and for at least one of the process steps.

Moreover, the process simulation model environment can operate to identify which data items of the process execution logs should be considered for defining partitions based on user selected criteria or selected rules for matching similar data.

Figure 6:
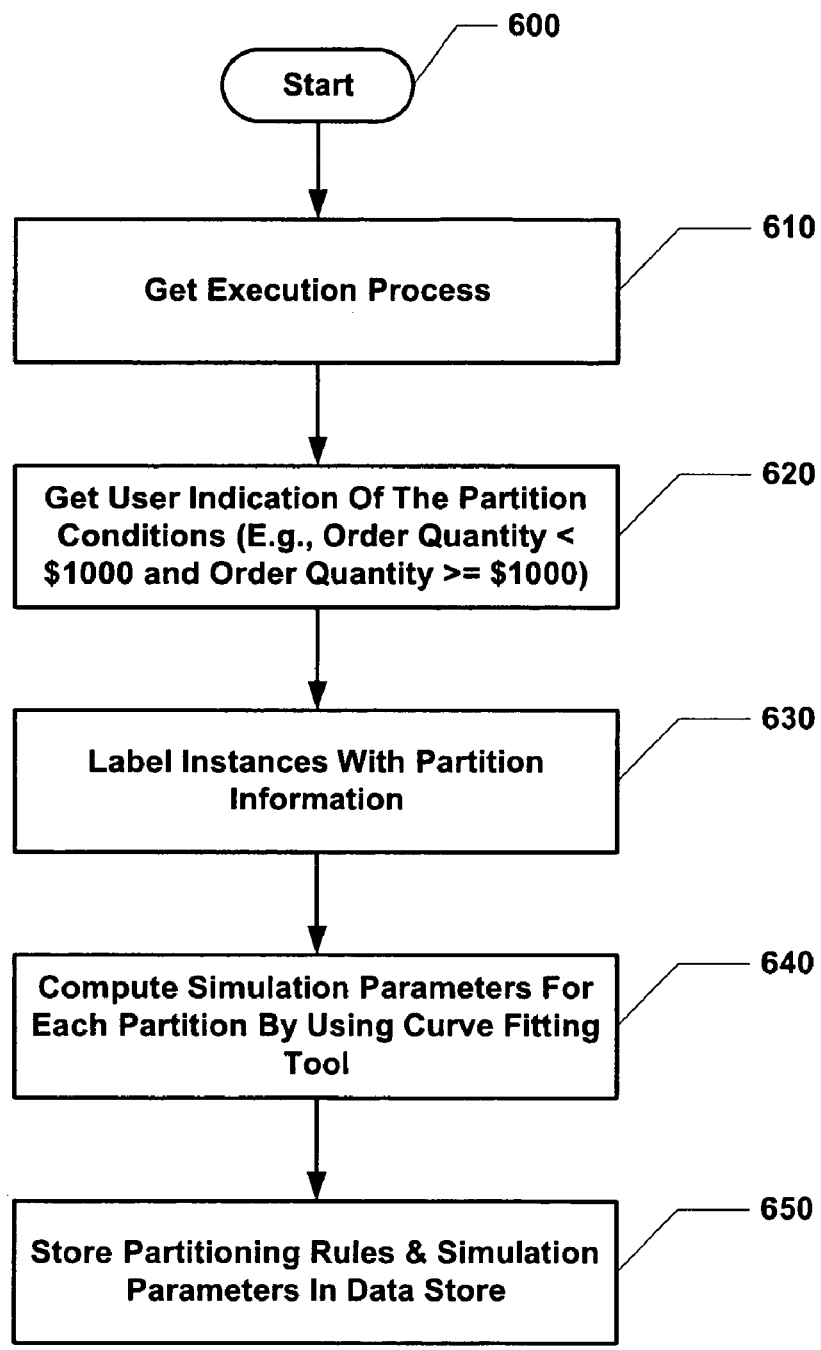
FIG. 6 is a flow diagram of the processing performed when handling process simulation in accordance with another illustrative implementation of the herein described systems and methods.

FIG. 6 shows the processing performed by an exemplary process simulation model engine when performing process simulation modeling. As is shown, processing begins at block 600 and proceeds to block 610 where an execution process is obtained. From there, processing proceeds to block 620 where an indication of the partition conditions are obtained (e.g., obtained from a participating user). In an illustrative implementation, a partition condition can include, but is not limited to, setting a numeric range for a process step, e.g., Order Quantity<$1000. Once the partition conditions are obtained, instances having the partition condition are labeled with partition information at block 630 (e.g., applying the partitioning rules to a process instance to determine which partition the process instance belongs). The simulation parameters are then computed for the partitions using one or more curve fitting techniques at block 640 (e.g., a curve fitting technique can be applied to the process instances in each partition so that the statistical characteristics, such as the distribution type of the step duration, normal or exponential, and the distribution parameters, of each step can be determined). Processing then proceeds to block 650 where the partitioning rules and simulation parameters are stored for future use by an exemplary process simulation model engine when processing other execution processes.

Figure 7:
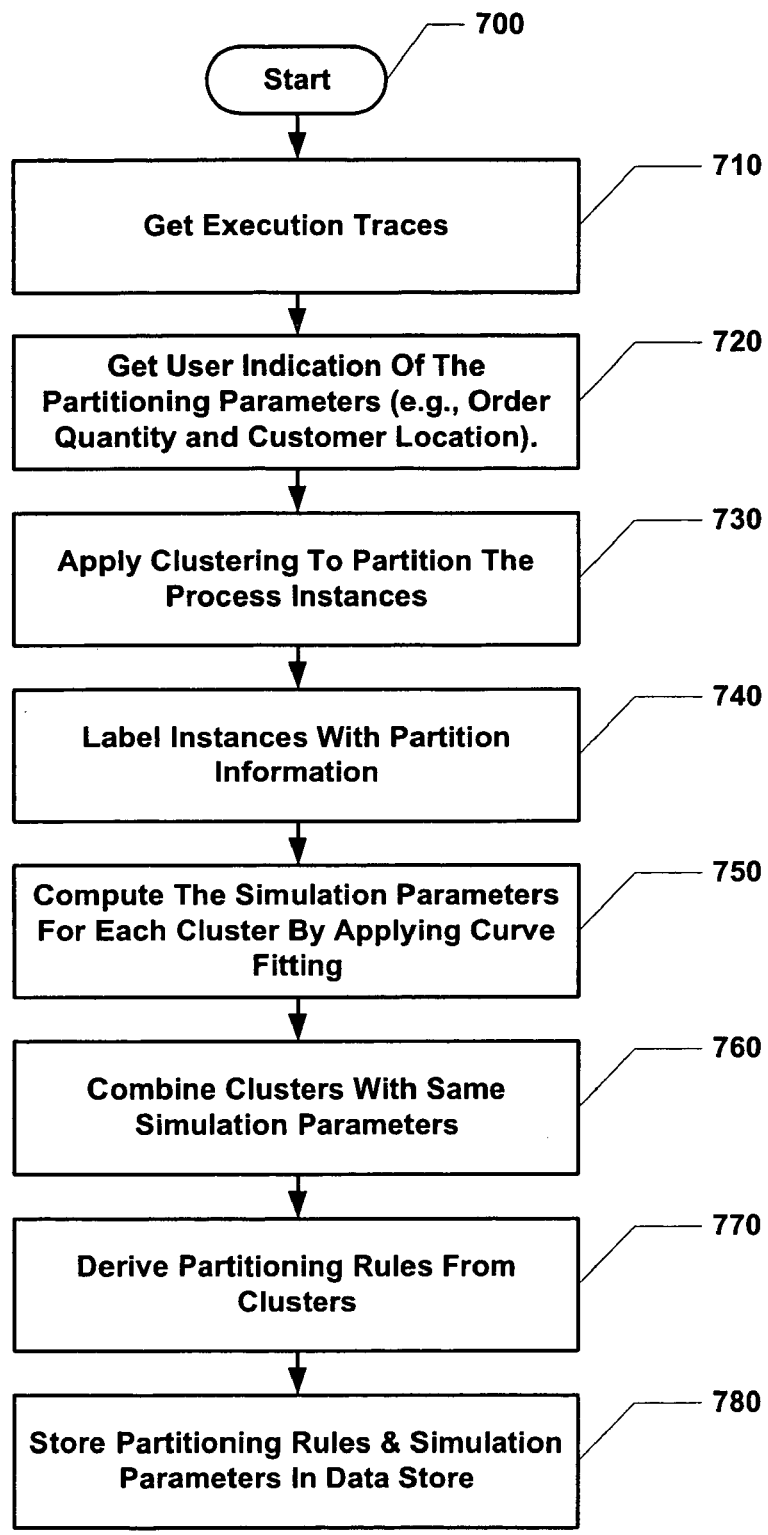
FIG. 7 is a flow diagram of the processing performed when handling cluster-based process simulation in accordance with another illustrative implementation of the herein described systems and methods.

FIG. 7 shows the processing performed by an exemplary process simulation model engine when performing cluster-based process simulation modeling (e.g., no user-defined partitioning rules). As is shown, processing begins at block 700 and proceeds to block 710 where execution traces are obtained. From there processing proceeds to block 720 where an indication of the partitioning parameters are obtained for processing (e.g., a participating user can offer partitioning rules and/or allow the process simulation model environment to automatically generate partitioning rules—or at least the thresholds for a particular rule. For example, the user can provide a partitioning criteria such that the process can be partitioned on the Order_Amount attribute. In such context, the exemplary process simulation model environment can identify that the optimal partitions to be—Order_Amount<$500 and Order_Amount>=$500 since, for example, these exemplary partitions can maximize the differences in simulation parameters for the exemplary simulation models that can be derived from the two partitions). Clustering is then applied to partition the process at block 730 (e.g., cluster the instances, based on similarities on the process attributes selected by the user (or based on all process attributes if none are selected)). From there, instances with the partition information are labeled for future processing at block 740. The simulation parameters are then computed for each cluster using one or more curve fitting techniques at block 750 (e.g., using the curve fitting technique, the process simulation model environment can determine that that two or more clusters have the same or similar value for all the simulation parameters and can merge these similar clusters). The clusters with the same simulation parameters are then combined at block 760. From there, partitioning rules are derived from the combined clusters at block 770. Processing then proceeds to block 780 where the partitioning rules and simulation parameters are stored in a data store for future use by an exemplary process simulation model engine when processing other process models.

It is understood that the herein described systems and methods are susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for process simulation, comprising:
   identifying a process model that models steps of a process;
   obtaining process execution data, including process instances that are representative of corresponding past executions of the process;
   partitioning different ones of the process instances into different partitions in accordance with a partitioning rule;
   generating simulation parameters for different partitions resulting from said partitioning;
   modeling the process by generating separate simulation models for the different partitions based on the simulation parameters for said different partitions; and
   storing the separate simulation models onto a computer-readable medium.

2. The method of claim 1, further comprising:
   receiving the partitioning rule from a participating user.

3. The method of claim 1, further comprising:
   receiving the partitioning rule from a clustering module that produces clusters of the process instances.

4. The method of claim 1, further comprising:
   generating the simulation parameters using a curve fitting tool.

5. A method for process simulation, comprising:
   identifying a process;
   partitioning different instances of execution of the process into different partitions in accordance with a partitioning rule;
   generating simulation parameters for each partition;
   simulating the process using the simulation parameters; and
   storing the simulation parameters onto a computer-readable medium.

6. A method for process simulation, comprising:
   receiving execution process data;
   receiving partitioning rule data for the execution process;
   labeling different instances of the execution process with partitioning information in accordance with the partitioning rules;
   generating simulation parameters for each partition using a curve fitting tool; and
   simulating the process by using the simulation parameters in a process simulation model engine.

7. An apparatus, comprising:
   a computer-readable medium storing computer-executable instructions for process simulation, said instructions comprising:
   identifying a process model that models steps of a process;
   obtaining process execution data, including process instances that are representative of corresponding past executions of the process;
   partitioning different ones of the process instances into different partitions in accordance with a partitioning rule;
   generating simulation parameters for different partitions resulting from said partitioning;
   modeling the process by generating separate simulation models for the different partitions based on the simulation parameters for said different partitions; and
   storing the separate simulation models onto a computer-readable medium.

8. The apparatus of claim 7, said instructions further comprising:
   receiving the partitioning rule from a clustering module.

9. The apparatus of claim 7, said instructions further comprising:
   generating the simulation parameters using a curve fitting tool.

10. A system for process simulation, comprising a:
    means for identifying a process model that models steps of a process;
    means for obtaining process execution data, including process instances that are representative of corresponding past executions of the process;
    means for partitioning different ones of the process instances into different partitions in accordance with a partitioning rule;
    means for generating simulation parameters for different partitions resulting from said partitioning;
    means for modeling the process by generating separate simulation models for the different partitions based on the simulation parameters for said different partitions; and
    means for storing the separate simulation models onto a computer-readable medium.

11. The system of claim 10, further comprising:
    means for receiving the partitioning rule from a clustering module.

12. The system of claim 10, further comprising:
    means for generating the simulation parameters using a curve fitting tool.

13. The method of claim 1, wherein the simulation parameters comprise an indication of how often new process instances are created.

14. The method of claim 1, wherein the simulation parameters comprise a probability that the process will follow a certain flow path.

15. The method of claim 1, wherein the process comprises a customer service process.

16. The method of claim 1, wherein at least one of the partitions is generated by obtaining a user-specified partitioning attribute and then identifying a partitioning threshold with respect to said attribute.

17. The method of claim 3, further comprising:
    merging the clusters produced by the clustering module.

18. The method of claim 5, wherein the partitioning rule is obtained by clustering past instances of executions of the process based on process attributes of said past instances of executions of the process.

19. The method of claim 5, wherein the simulation parameters comprise an indication of how often new process instances are created.

20. The method of claim 5, wherein the simulation parameters comprise a probability that the process will follow a certain flow path.

21. The method of claim 5, wherein the process comprises a customer service process.

22. The apparatus of claim 7, wherein the simulation parameters comprise a probability that the process will follow a certain flow path.

23. The apparatus of claim 7, wherein the process comprises a customer service process.

24. The apparatus of claim 7, wherein the partitioning rule is obtained by clustering past instances of executions of the process based on similarities of process attributes of said past instances of executions of the process.

* * * * *